United States Patent Office 2,895,118
Patented July 14, 1959

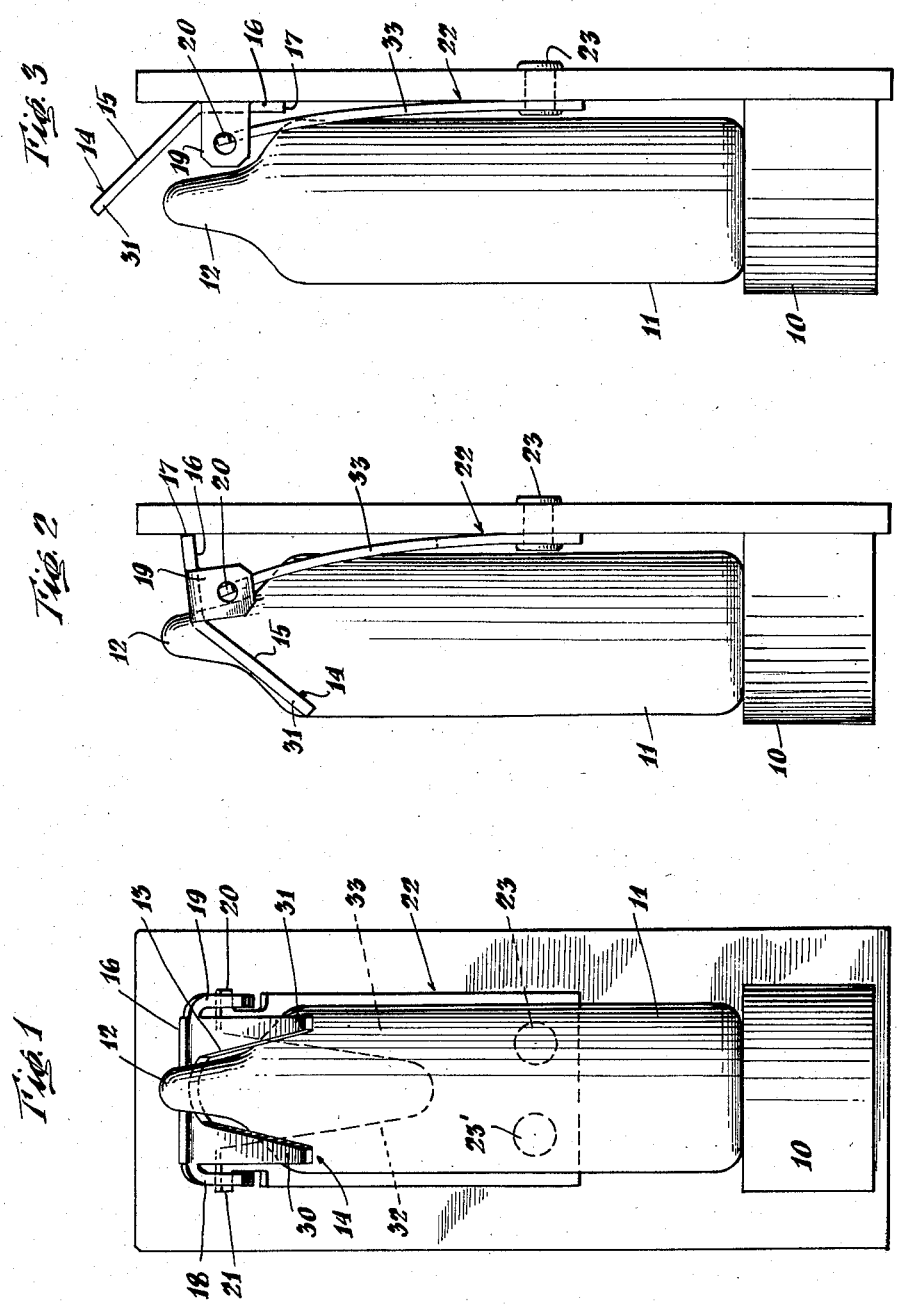

2,895,118
TUBE RETAINER

Clarence Huetten and Eldon D. Aldred, Indianapolis, Ind., assignors to P. R. Mallory & Co., Inc., Indianapolis, Ind., a corporation of Delaware Application July 7, 1955, Serial No. 520,451

4 Claims. (Cl. 339—75)

This invention relates generally to tube retainers and has particular reference to such devices including those for retaining subminiature tubes of the button and flat press types.

In many applications calling for subminiature tubes it is required that they be held and retained in a mounting which is placed parallel to the chassis of the device utilizing such tubes. In one such device, for example, the device must hold a subminiature flat press type of tube against a vibration of 10 G's; viz: units of gravitational pull. Thus, to allow a safety factor the tube retainer should be of such nature that it should exert a force of substantially 125 gms. (.275 lb.) to hold the tube weight of 2.5 gms. during 50 G vibration. Further, it is important that such devices keep from rubbing against the tube during removal or insertion thereof, since such tubes may have an external shield coating that may be relatively easily scraped off.

The present invention thus provides the improved and novel construction for a tube retainer which is adapted to include features satisfying the criteria described above and comprises a simplified construction including a mounting spring and bracket. The cantilever type of construction affords a spring which exerts a force on the bracket, tending to hold the bracket rigidly against the chassis. The shape of the bracket transforms a component of the force exerted by the spring in a direction tending to hold the tube firmly in its socket. Because of its shape, the bracket also restricts the movement of the tube in planes lying perpendicular to the axis of the tube. It is also necessary to provide for allowances in manufacturing deviations of tube length and seal size. This characteristic is met and overcome by providing requisite spring deflection.

It is therefore among the objects of the present invention to provide a tube retention means for all types of subminiature electron tubes, including those of the flat press and button types. Among the features of the invention it may be stated that the retainer exerts sufficient axial force to maintain the tube in its socket under conditions of great vibration. It further restricts the movement of the top of the tube in the two planes perpendicular to the axis of the tube. It does not restrict removal or replacement of the tube in a direction along the axis of the tube, and further allows for unimpeded placement thereof in the socket without damage thereto upon removal.

Some other features are that the tube retainer makes for easy access to the tube on the placement thereof and may be replaced or removed without complicated tools as by the mere use of finger manipulation. The tube retainer is adapted, further, to allow for variations in manufacturing techniques.

A further feature herein is that the tube retainer of the present invention merely takes up and utilizes the space between the chassis and the tube or the tube top, per se, without the further necessity of providing tube shielding.

The invention in another of its aspects relates to the novel features of the instrumentalities described herein for teaching the principal objects of the invention and to the principles embodied in these instrumentalities, whether or not these features and principles may be used in the said objects and/or in similar fields.

Other objects and advantages will become apparent as the description proceeds and the scope of the invention is to be gathered from and determined by the claims, read in conjunction with the specification hereof.

Referring now to the drawings:

Fig. 1 is a side elevational view of the tube retainer of the present invention showing the tube being retained in a locked position therewithin;

Fig. 2 is a plan view of the invention of the tube retainer as adapted to illustrate the mounting of the tube therewithin; and Fig. 3 is a side elevational view of the tube retainer as adapted to show the unlocked position thereof and as illustrating the ease with which said tube is adapted to be removed from its socket in a direction parallel to its axial plane.

Generally speaking, the present invention comprises a device which is adapted to support a subminiature electron emitting tube of the flat press or button type in sockets utilized in printed circuit applications or miniaturized assemblies.

It is usual in these assemblies that the tube used therewith be held in a right angle miniature tube socket in a manner such that the longitudinal extent thereof traverses a plane parallel to that of the chassis. As the utilization of these tubes is required in environments encompassing great vibration, such vibration being in the order of 20 G's, it is apparent that the tube retainer must be novelly constructed so as to maintain the tube within its corresponding socket tightly against such vibration. It is a further requirement that these tubes be removed easily and without undue utilization of tools.

The present device comprises a cantilever type of tube retainer assembly including a spring fabricated of beryllium copper having a silver plate coating and a bracket fabricated of brass also having a silver plate finish or coating. The bracket has a U-shaped cradle-like construction, adapting it for use with most types of subminiature tubes, such as the button or flat press type tubes. The assembly is permanently affixed to the chassis by a resilient, flat type, bowed spring. By its resilient, cantilever construction it rigidly holds the end of the tube in a position which applies minimum stress to the tube and prevents motion to the top of the tube in a plane perpendicular to the tube's axis. The simplicity of the tube retainer avoids the use of considerable area heretofore needed by such retention means. Thus, it is that a minimum amount of area is employed for retaining the tube, said area being merely the space between the tube lying parallel to the chassis and the top of the tube as it lies parallel along the axis of the chassis. This is an important aspect of the invention inasmuch as these tubes are being used in military applications where space is at a premium and it is necessary that the components be of as small dimensions as possible. As an example of the miniscular dimensions, the entire assembly in its open position is 1 3/16" long and 15/32" wide.

The tube retainer is constructed so that it operates on the over-center spring principle, with the spring biasing a bracket against the chassis and the tube. Accordingly, the retainer, in thus utilizing a minimum of space between the tube and the chassis, may be said to overcome one of the inherent difficulties provided in the utilization of such retaining devices. Moreover, under actual test condition the retainer supports a tube under conditions of 2000 cycles at 20 G's.

By the novelly shaped construction of the angulated bracket several types of tubes may be utilized therewith, with the distance between right angle socket and mounting eyelets associated with the spring of the retainer variable so as to allow use of different lengths of subminiature tubes. The wide bracket base and the force of the spring limit the motion of the top of the tube in a plane which is perpendicular to the tube axis. The bracket is so configured, moreover, and novelly constructed so that the retainer exerts a force tending to hold the tube in its socket. Further, the configuration of the tube bracket is adapted to distribute the longitudinal force exerted on the tube.

When it is desired to replace the tube, the bracket of the tube retainer may be pulled back over center, causing the tube retainer to snap practically flat against the chassis. This releases the tube for easy removal. When the tube has been replaced, the tube retainer may again be returned to its original holding position by lifting the outermost end of the bracket.

Fig. 1 illustrates the tube retainer in a closed position with the retainer holding the tube above the chassis in a manner such that very little stress is placed on the pins of the tube as they fit into the right angle tube socket.

Reference numeral 10 indicates the right angle socket adapted to hold a pressed or button type electron emitting tube in a plane generally parallel to the axis of the chassis. Electron emitting tube 11 has a top portion 12 adapted to fit within the U-shaped, cradle-like cut-out 13 formed in bracket 14. By this cut-out two tapered fingers 30 and 31 are formed to act in the retention of the top of the tube. Bracket 14 comprises two sections 15 and 16 angularly disposed with relation to each other at approximately 45 degrees. Section 15 comprises a cradle-like portion having a general U-shaped configuration for allowing the tube top to be fitted therewithin to an extent determined by the contour thereof, while section 16 of the bracket comprises a foot portion 17 containing the arc portion of the cradle and also has apertured side walls 18 and 19 situated at the point of angle and which are adapted to receive the tongues 20 and 21 integrally formed as lateral extensions of fingers 32 and 33 of cooperating spring 22. Spring 22 is fastened so as to be rigidly maintained on the chassis by means of rivets 23 and 23'. It is to be noted that in the operation of the retainer and by its natural resilience spring 22 becomes bowed so as to afford a contour necessary to lock the tube in place within the cradle or cut-out of the bracket. The bracket may be rotated with reference to its associated spring for substantially 160 degrees to lock the tube against movement with relation to the chassis. The tubes are easily removed by pulling the bracket away from the tube so that when it meets the chassis itself it is evident that little restraint is applied to the tube and hence it can be removed without tools and merely by the utilization of the mechanic's fingers.

The open position of the bracket is illustrated in Fig. 3, which indicates that in order to remove the tube the bracket is merely pulled away from the tube by one's fingers. The bracket's over-center properties will keep it flat against the chassis, as shown, and the tube may then be removed by pulling the same along the longitudinal axis.

The invention of the subminiature tube retainer hereinbefore described is intended to be merely illustrative and it is not intended that the scope thereof be limited thereto, but rather that its applications be determined from a reading of the claims as taken in conjunction with the description thereof.

We claim:

1. A tube retainer for use in combination with a subminiature electron emitting vacuum tube having contact pins held in a tube socket mounted at right angles to a chassis, said tube lying in a plane parallel thereto, said retainer comprising a resilient, flat spring, a front end of said spring having a center tapered, cut-out portion holding a part of said tube, fingers thus formed in said spring by said center, cut-out portion, each of said fingers having an extension, a back end of said spring being retained against said chassis by means of rivets eyeleted to said chassis, a bracket coupled to said extensions, said bracket including a lower portion adapted to angularly move with relation to said chassis in a plane perpendicular thereto on said extensions of said fingers of said spring, said lower portion of said bracket bearing against said chassis with a portion of said spring thus being spaced in a bowed fashion up from said chassis thereby, and a center cut-out on said bracket adapted to support an end of said tube therein whereby said tube is substantially rigidly mounted in its tube socket against substantial vibration with minimum force exerted on its pins.

2. A tube retainer for use in combination with a subminiature electron emitting vacuum tube having contact pins held in a tube socket mounted at right angles to a chassis, said retainer comprising a flat, resilient spring, a front end of said spring having a center, tapered, cut-out portion extending for a distance therein, fingers formed thereby in said spring by said cut-out portion, each of said fingers having an extension, a back end of said spring being staked tightly against said chassis, a bracket having a top portion and bottom portion, said portions being angulated with respect to each other coupled to said extensions, said bracket adapted to rotationally move a considerable angle with relation to said chassis on said extensions of said fingers of said spring, the bottom portion of said bracket adapted to meet with said chassis in the nature of a prop and to space a portion of said resilient spring from said chassis thereby, and a U-shaped cut-out centrally cut in said bracket for a distance therein adapted to support an end of said tube whereby said tube is substantially rigidly mounted in its tube socket in a plane parallel to said chassis and is inhibited against substantial vibration while exerting a minimum force on the pins of said tube and locking the same firmly in place.

3. A tube retainer for use in combination with subminiature electron emitting vacuum tubes of the button and press type having contact pins as adapted to be held in a tube socket mounted vertically on a chassis, said retainer comprising a flat, thin, resilient spring, a front end of said spring cut to form a pair of separated fingers, said fingers having extensions extruding therefrom, a back end being whole and being retained flat against said chassis by means of rivets, a metal bracket having a portion cut out therefrom to a determined extent coupled to said extensions, said bracket having a top portion and a bottom portion angulated with respect to each other and being integrally formed, said bracket being adapted to rotate a considerable angle in a plane perpendicular with relation to said chassis on said extensions of said fingers of said spring, a portion of said spring being spaced on the rotation of said bracket from said chassis by the lower portion of said bracket acting as a prop thereagainst, and cradling means afforded by the cut-out portion made in said bracket adapted to snugly support an end of said tube whereby said tube is substantially rigidly mounted in a plane parallel to said chassis in its tube socket against substantial vibration with minimum force being exerted on its pins.

4. A tube retainer for use in combination with subminiature electron emitting vacuum tubes of the button and press type having contact pins as adapted to be held in a tube socket mounted on a chassis, said tube retainer comprising a flat, thin, resilient spring, a front end of said spring cut for a determined extent to define a pair of fingers having lateral extensions, a back end being whole and adapted to lie flat against said chassis to be connected thereto, a bracket having a U-shaped cut-out made thereon coupled to said extensions, said bracket having upper and lower portions angulated with respect to each other, the U-shaped cut-out thereon forming two tapered fingers in the top portion and an arc in the lower portion with a pair of apertured, integrally formed lugs situated at the base of the angle formed between the aforesaid portions to accept the lateral extensions of said spring so as to provide a coupling between said bracket and said spring in a loose fashion, thus adapting said bracket to rotate a considerable angle with relation to said chassis on said extensions of said spring, a portion of said spring thus being spaced from said chassis thereby to support an end of said tube whereby said tube is substantially rigidly mounted in its tube socket against substantial vibration with minimum force exerted on its pins, said tube being thus easily locked therein and removed therefrom on the rotation of said bracket.

References Cited in the file of this patent

UNITED STATES PATENTS

| | | |
|---|---|---|
| 1,213,187 | Haddan | Jan. 23, 1917 |
| 1,825,975 | Patenge | Oct. 6, 1931 |
| 2,325,595 | Dieke | Aug. 3, 1943 |
| 2,575,601 | Staver | Nov. 20, 1951 |